United States Patent
Yu et al.

(10) Patent No.: US 10,491,517 B2
(45) Date of Patent: Nov. 26, 2019

(54) PACKET PROCESSING METHOD IN CLOUD COMPUTING SYSTEM, HOST, AND SYSTEM

(71) Applicant: HUAWEI TECHNOLOGIES CO., LTD., Shenzhen, Guangdong (CN)

(72) Inventors: Zhou Yu, Xi'an (CN); Leiqiang Zhang, Xi'an (CN); Yuxin Zhuang, Beijing (CN); Hao Luo, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/407,196

(22) Filed: May 9, 2019

(65) Prior Publication Data
US 2019/0280971 A1   Sep. 12, 2019

Related U.S. Application Data

(63) Continuation of application No. PCT/CN2016/105227, filed on Nov. 9, 2016.

(51) Int. Cl.
*H04L 12/713* (2013.01)
*H04L 12/46* (2006.01)
*H04L 29/08* (2006.01)

(52) U.S. Cl.
CPC ........ *H04L 45/586* (2013.01); *H04L 12/4641* (2013.01); *H04L 67/10* (2013.01)

(58) Field of Classification Search
CPC ... H04L 45/586; H04L 12/4641; H04L 67/10; H04L 49/354; H04L 49/70
See application file for complete search history.

(56) References Cited

U.S. PATENT DOCUMENTS

| | | |
|---|---|---|
| 2013/0031233 A1 | 1/2013 | Feng et al. |
| 2013/0308641 A1 | 11/2013 | Ackley |
| 2013/0315060 A1 | 11/2013 | Aybay et al. |

(Continued)

FOREIGN PATENT DOCUMENTS

| | | |
|---|---|---|
| CA | 2991208 A1 | 5/2018 |
| CA | 2991359 A1 | 5/2018 |

(Continued)

OTHER PUBLICATIONS

Yaozu Dong et al, High Performance Network Virtualization with SR-IOV. 2009 IEEE, 11 pages.

(Continued)

*Primary Examiner* — Kwang B Yao
*Assistant Examiner* — Ricardo H Castaneyra
(74) *Attorney, Agent, or Firm* — Huawei Technologies Co., Ltd.

(57) ABSTRACT

A packet processing method in a cloud computing system is disclosed. The cloud computing system includes a host and a cloud management platform. At least one network interface card is connected to the host. The at least one network interface card includes at least three network ports. A first virtual machine running on the host sends a data packet to a second network port through a first network port using a network cable between the first and the second network port. The second network port sends the data packet to a virtual machine monitor (VMM) of the host for performing network function processing. The data packet is then sent to a second virtual machine via a third network port of the host after the network function processing.

19 Claims, 5 Drawing Sheets

(56) References Cited

U.S. PATENT DOCUMENTS

| | | |
|---|---|---|
| 2014/0003442 A1 | 1/2014 | Hernandez et al. |
| 2014/0089486 A1 | 3/2014 | Natham et al. |
| 2014/0208317 A1 | 7/2014 | Nakagawa et al. |
| 2015/0026681 A1 | 1/2015 | Lin et al. |
| 2015/0113114 A1 | 4/2015 | Zhang et al. |
| 2015/0127830 A1 | 5/2015 | Brown et al. |
| 2015/0215207 A1 | 7/2015 | Qin et al. |
| 2015/0326524 A1 | 11/2015 | Tankala et al. |
| 2016/0232019 A1 | 8/2016 | Shah et al. |
| 2016/0350151 A1 | 12/2016 | Zou et al. |

FOREIGN PATENT DOCUMENTS

| | | |
|---|---|---|
| CN | 101309180 A | 11/2008 |
| CN | 102457586 A | 5/2012 |
| CN | 102790777 A | 11/2012 |
| CN | 103051529 A | 4/2013 |
| CN | 103346981 A | 10/2013 |
| CN | 103609077 A | 2/2014 |
| CN | 103621026 A | 3/2014 |
| CN | 103873374 A | 6/2014 |
| CN | 103916314 A | 7/2014 |
| CN | 105978828 A | 9/2016 |
| JP | 2014143560 A | 8/2014 |
| WO | 2016107594 A1 | 7/2016 |

OTHER PUBLICATIONS

IEEE 802 Tutorial: Edge Virtual Bridging. Nov. 2009, Atlanta, GA, 54 pages.

Hewlett-Packard Corp et al, Edge Virtual Bridge Proposal, Version 0, Rev 0.1, Apr. 23, 2010, 72 pages.

Xu Huawei Technologies X: "Virtual Subnet: A Scalable Data Center Interconnection Solution;draft-xu-virtual-subnet-05.txt", No. 5, Apr. 11, 2011, pp. 1-10, XP015075250.

Postel Isi J:"Multi-LAN Address Resolution; rfc925.txt", Switzerland, Oct. 1, 1984, XP015006918, 16 pages.

Anonymous: "In-switch ARP handling with OpenState", Nov. 5, 2016, XP055602384, 6 pages.

PACKET PROCESSING METHOD IN CLOUD COMPUTING SYSTEM, HOST, AND SYSTEM

CROSS-REFERENCE TO RELATED APPLICATIONS

This application is a continuation of International Application No. PCT/CN2016/105227, filed on Nov. 9, 2016, the disclosure of which is hereby incorporated by reference in its entirety.

TECHNICAL FIELD

The present application relates to the field of information technologies, and in particular, to a packet processing method in a cloud computing system, a host in the cloud computing system, and the could computing system.

BACKGROUND

Virtualization technology is one of key technologies in the cloud computing field. According to the virtualization technology, physical resources of a host can be abstracted into a shared resource pool that is to be used by virtual machines (VM) running on the host. The virtual machines running on the host may share a network interface card of the host, to communicate with an external network. In the existing technology, by means of network interface card virtualization, the network interface card may be allocated to the virtual machines for use. Network interface card virtualization may be implemented by means of single-root input/output virtualization (SR-IOV) or multi-root input/output virtualization (MR-IOV). The network interface card virtualization is also referred to as network interface card passthrough. In the following, SR-IOV is used as an example. When the network interface card supports SR-IOV, the virtual machines running on the host may share the network interface card on the host by using the SR-IOV technology.

When a network interface card supporting the SR-IOV is used on the host, a network port of the network interface card is virtualized into at least one physical function (PF) and multiple virtual functions (VF). A virtual machine on the host is connected to at least one VF. The network interface card is internally provided with a switching apparatus that functions as a switch. The switching apparatus forwards a data packet according to a media access control (MAC) table, and forwards a data packet between a physical network port, the PF, and the VF. Because of limited processing and storage capabilities, the switching apparatus cannot provide abundant network functions such as security group, quality of service (QoS), layer 2 tunnel encapsulation, and distributed routing.

SUMMARY

Embodiment of this application describes a packet processing method in a cloud computing system, a host, and a system, to resolve a problem that abundant network functions cannot be provided in a network interface card passthrough scenario.

According to a first aspect, an embodiment of the present application provides a host. At least one network interface card is connected to the host. A virtual machine monitor (VMM) runs on the host, and a first virtual machine runs on the VMM. The VMM includes multiple virtual local area network (VLAN) subinterfaces and a virtual network function module. The at least one network interface card includes switching apparatuses and at least three network ports. A first network port and a second network port support a network interface card virtualization capability. The first network port corresponds to at least one physical function (PF) and multiple virtual functions (VFs). VLAN identifiers are configured for the multiple VFs, and the VLAN identifiers of the VFs are different from each other. The first virtual machine is connected to at least one VF of the first network port. A quantity of VLAN subinterfaces is the same as a quantity of VFs of the first network port, and the VLAN subinterfaces are in a one-to-one correspondence with the VFs of the first network port. The VLAN subinterfaces have same VLAN identifiers as the VFs corresponding to the VLAN subinterfaces, and the first network port and the second network port are connected by using a network cable.

The first virtual machine sends a data packet to a second virtual machine by using the VF that is connected to the first virtual machine. The data packet carries a VLAN identifier of the VF that sends the data packet. Switching apparatus of the first network port receives the data packet, and forcibly forwards the data packet to the second network port by using the network cable. Switching apparatus of the second network port sends, according to the VLAN identifier carried in the data packet, the data packet to a VLAN subinterface that has a same VLAN identifier as the data packet. The VLAN subinterface receives the data packet, removes the VLAN identifier in the data packet, and sends the data packet to the virtual network function module. The virtual network function module performs network function processing on the changed data packet, and sends the processed data packet to the second virtual machine. In a network interface card passthrough scenario, after sending a data packet from a passthrough VF, a virtual machine may send the data packet to a virtual network function module on a VMM in the foregoing manner. Abundant network functions are provided by using the software module, so as to implement network function processing on the data packet.

In a possible design, the first network port and the second network port are in a virtual Ethernet port aggregator (VEPA) mode. In the VEPA mode, the data packet may be forcibly forwarded between the first network port and the second network port. It should be noted that the VEPA mode is only one manner of forcibly forwarding the data packet. Another software setting or hardware setting may be used to forcibly forward the data packet. This embodiment of the present application imposes no limitation thereon.

In a possible design, the host further includes a device management module, and the device management module is configured to create a VLAN subinterface.

After the first virtual machine is successfully created, the device management module is configured to receive a VLAN subinterface creation request from a cloud management platform, where the VLAN subinterface creation request carries the VLAN identifier of the VF that is allocated to the first virtual machine. The device management module is further configured to send a notification message to the VMM to instruct the VMM to create the VLAN subinterface corresponding to the VF of the first virtual machine, where the VLAN subinterface corresponding to the VF of the first virtual machine has a same VLAN identifier as the VF of the first virtual machine.

The at least one network interface card includes the at least three network ports, and the at least three network ports may be located on a same network interface card or on different network interface cards. When the first network port and the second network port are located on a same network interface card, the first network port and the second network port may share a switching apparatus of the network interface card, or each of the first network port and the second network port may have independent switching apparatuses.

In a possible design, a source virtual machine (the first virtual machine) and a destination virtual machine (the second virtual machine) of the data packet are located on a same host. The virtual network function module sends the processed data packet to a VLAN subinterface corresponding to a VF that is connected to the second virtual machine. The VF that is connected to the second virtual machine has a same VLAN identifier as the VLAN subinterface receiving the processed data packet. The VLAN subinterface corresponding to the VF that is connected to the second virtual machine adds a VLAN identifier of the VLAN subinterface to the data packet, and sends the data packet to the second network port. The switching apparatus of the second network port forcibly forwards the data packet to the first network port by using the network cable. The switching apparatus of the first network port sends, according to the VLAN identifier carried in the data packet, the data packet to the VF identified by the VLAN identifier in the data packet, so that the data packet is transmitted to the second virtual machine.

In a possible design, a source virtual machine (the first virtual machine) and a destination virtual machine (the second virtual machine) of the data packet are located on different hosts. The virtual network function module is specifically configured to establish a tunnel between the virtual network function module and another virtual network function module on a host on which the second virtual machine is located. The virtual network function module sends the processed data packet to an external physical switch by using a third network port, and sends, by using the external physical switch, the processed data packet to the host on which the second virtual machine is located. Therefore, the other virtual network function module sends the processed data packet to the second virtual machine.

According to a second aspect, corresponding to the apparatus in the first aspect, an embodiment of the present application further provides a packet processing method in a cloud computing system. At least one host in the cloud computing system includes a virtual machine monitor (VMM) and at least one network interface card, a first virtual machine runs on the host, the VMM includes multiple VLAN subinterfaces and a virtual network function module, and the at least one network interface card includes switching apparatuses and at least three network ports, where a first network port and a second network port support a network interface card virtualization capability, the first network port corresponds to at least one PF and multiple VFs, VLAN identifiers are configured for the multiple VFs and the VLAN identifiers of the VFs are different from each other, the first virtual machine is connected to at least one VF of the first network port, a quantity of VLAN subinterfaces is the same as a quantity of VFs of the first network port and the VLAN subinterfaces are in a one-to-one correspondence with the VFs of the first network port, the VLAN subinterfaces have same VLAN identifiers as the VFs corresponding to the VLAN subinterfaces, and the first network port and the second network port are connected by using a network cable; and the method includes:

sending, by the first virtual machine, a data packet to a second virtual machine by using the VF that is connected to the first virtual machine, where the data packet carries a VLAN identifier of the VF that sends the data packet, and an address of the second virtual machine;

receiving, by a switching apparatus of the first network port, the data packet, and forcibly forwarding the data packet to the second network port by using the network cable;

receiving, by a switching apparatus of the second network port, the data packet from the first network port, and sending, according to the VLAN identifier carried in the data packet, the data packet to a VLAN subinterface identified by the VLAN identifier;

receiving, by the VLAN subinterface, the data packet, removing the VLAN identifier in the data packet, and sending the data packet to the virtual network function module; and performing, by the virtual network function module, network function processing on the changed data packet, and sending the processed data packet, where a destination address of the processed data packet is the address of the second virtual machine.

In a possible design, the first network port and the second network port are in a VEPA mode.

In a possible design, the method further includes a VLAN subinterface creation process. The VLAN subinterface creation process includes: receiving, by a device management module of the host after the first virtual machine is successfully created, a VLAN subinterface creation request from a cloud management platform, where the VLAN subinterface creation request carries the VLAN identifier of the VF that is allocated to the first virtual machine; and sending, by the device management module, a notification message to the VMM, so that the VMM creates the VLAN subinterface corresponding to the VF of the first virtual machine, where the VLAN subinterface corresponding to the VF of the first virtual machine has a same VLAN identifier as the VF of the first virtual machine.

According to a third aspect, an embodiment of the present application provides a cloud computing system. The cloud computing system includes a cloud management platform and the host described in the first aspect. The cloud management platform is configured to create a first virtual machine on the host, and after successfully creating the first virtual machine, instruct a VMM of the host to create a VLAN subinterface corresponding to a VF of the first virtual machine. The VLAN subinterface corresponding to the VF of the first virtual machine has a same VLAN identifier as the VF of the first virtual machine.

According to a fourth aspect, corresponding to the foregoing apparatus, method, and system, an embodiment of the present application provides a host. The host has a function of implementing the host defined in the first aspect. The function may be implemented by hardware, or may be implemented by executing corresponding software by hardware. The hardware or software includes one or more modules corresponding to the foregoing function. Specifically, the host includes a first processor, a first memory, and at least one network interface card. The network interface card includes a second processor, a second memory, and at least two network ports, a first network port and a second network port in the at least one network interface card support a network interface card virtualization capability, the first network port corresponds to at least one PF and multiple VFs, VLAN identifiers are configured for the multiple VFs and the VLAN identifiers of the VFs are different from each other, the first memory and the second memory store instructions, the first processor executes a first instruction in the first memory to implement a function of a first virtual machine, the first virtual machine is connected to at least one VF of the first network port, the first processor executes a second instruction in the first memory to implement a function of a VLAN subinterface, the first processor executes a third instruction in the first memory to implement a function of a virtual network function module, and the second processor is configured to execute an instruction in the second memory to implement a function of a switching apparatus;

the first virtual machine is connected to the at least one VF of the first network port, the host includes multiple VLAN subinterfaces, a quantity of multiple VLAN subinterfaces is the same as a quantity of VFs of the first network port and the multiple VLAN subinterfaces are in a one-to-one correspondence with the VFs of the first network port, the VLAN subinterfaces have same VLAN identifiers as the VFs corresponding to the VLAN subinterfaces, and the first network port and the second network port are connected by using a network cable;

the first processor is configured to execute the first instruction in the first memory to perform the following step: sending a data packet to a second virtual machine by using the VF that is connected to the first virtual machine, where the data packet carries a VLAN identifier of the VF that sends the data packet, and an address of the second virtual machine;

the second processor is configured to execute the instruction in the second memory to perform the following step: receiving the data packet, and forcibly forwarding the data packet to the second network port by using the network cable;

the second processor is configured to execute an instruction in the second memory to perform the following step: receiving the data packet from the first network port, and sending, according to the VLAN identifier carried in the data packet, the data packet to a VLAN subinterface identified by the VLAN identifier;

the first processor is configured to execute the second instruction in the first memory to perform the following step: receiving the data packet, removing the VLAN identifier in the data packet, and sending the data packet to the virtual network function module; and the first processor is configured to execute the third instruction in the first memory to perform the following step: performing network function processing on the changed data packet, and sending the processed data packet to the second virtual machine according to the address of the second virtual machine.

In a possible design, the host and a cloud management platform are implemented by a general-purpose or dedicated server. The server includes a processor, a memory, a system bus, and an input/output interface. The processor is configured to support a corresponding function of the host/the cloud management platform in the system. The input/output interface is configured to communicate with another component in the cloud computing system. The processor executes the instructions stored in the memories.

According to a fifth aspect, an embodiment of the present application provides a computer storage medium that is configured to store a computer software instruction used by the foregoing host. The computer software instruction includes a program designed for executing the foregoing aspects.

According to a sixth aspect, an embodiment of the present application provides another computer storage medium that is configured to store a computer software instruction used by the switching apparatus in the foregoing network interface card. The computer software instruction includes a program designed for executing the foregoing aspects.

According to a seventh aspect, an embodiment of the present application provides a computer program. When a physical server runs the computer program, the physical server performs functions of a virtual machine, a VLAN subinterface, and a virtual network function module in a host.

According to an eighth aspect, an embodiment of the present application provides a computer program. When a processor or a programmable logic circuit in a network interface card runs the computer program, the network interface card performs a function of the switching apparatus in the foregoing aspects.

In conclusion, a virtual machine sends a data packet from a VF that is connected to the virtual machine. A switching apparatus of a first network port forcibly forwards the data packet to a second network port. A switching apparatus of the second network port sends the data packet to a VLAN subinterface on a VMM according to a VLAN identifier carried in the data packet. The VLAN subinterface transfers the data packet to a virtual network function module, and the virtual network function module provides abundant network function processing for the data packet. Based on network interface card passthrough, after sending a data packet from a passthrough VF, a virtual machine may send the data packet to a virtual network function module on a VMM in the foregoing manner. Abundant network functions are provided by using the software module, so as to implement network function processing on the data packet.

BRIEF DESCRIPTION OF DRAWINGS

The following briefly describes the accompanying drawings used in describing the embodiments.

DESCRIPTION OF EMBODIMENTS

Network architectures and service scenarios illustrated below are for the purpose of describing the technical solutions in the embodiments of the present application more clearly, and do not constitute any limitation on the technical solutions provided in the embodiments of the present application. With the evolution of network architectures and the emergence of new service scenarios, the technical solutions provided in the embodiments of the present application are also applicable for similar technical issues.

Figure 1A:
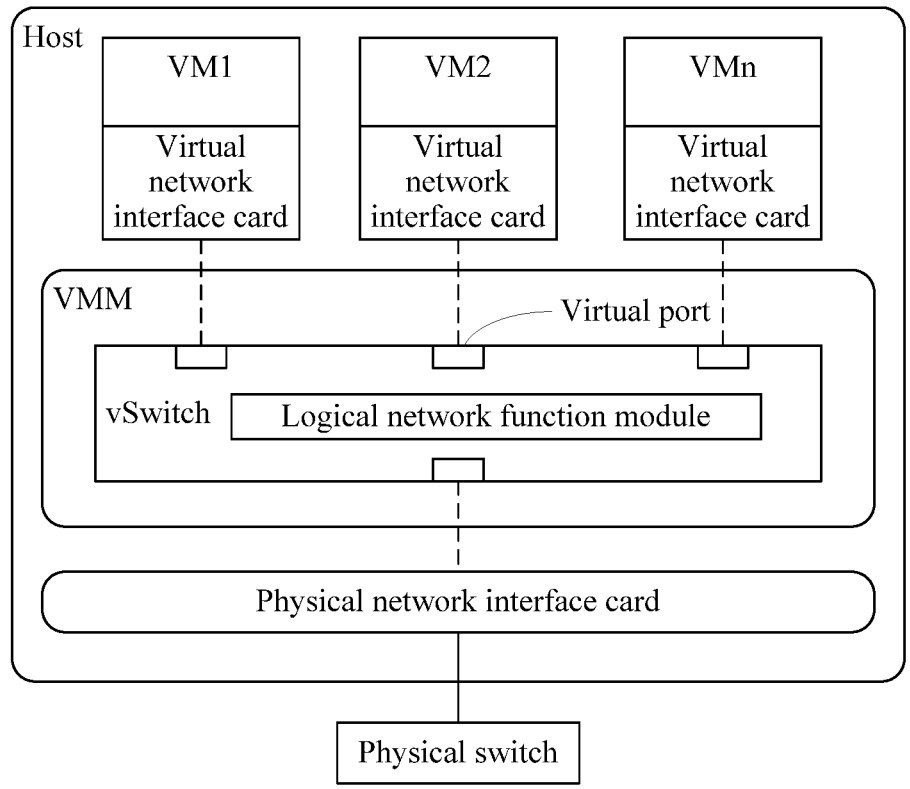
FIG. 1A is a schematic diagram of a virtualized structure on a host according to an embodiment of the present application.

FIG. 1A is a schematic diagram of a virtualized structure on a host according to an embodiment of the present application. The host is a physical server. A bottom layer of the physical server is a hardware layer. The hardware layer mainly includes hardware resources such as a central processing unit (CPU), a memory, a hard disk, and a network interface card. Server virtualization implements a virtualized running environment of multiple virtual machines (VM) on the physical server by using virtualization software (for example, VMWare® ESX or Citrix® XEN). A software layer that is installed on the server to implement a virtualized environment is referred to as a virtual machine monitor (VMM). The VMM running on the hardware layer is responsible for scheduling, allocating, and managing the hardware resources at the hardware layer. Multiple virtual machines (VMs) run on the VMM. The VMM provides each virtual machine with a hardware environment such as a virtualized CPU, memory, storage, input/output (I/O) device (such as a network interface card), and Ethernet switch, to ensure that the multiple virtual machines run in a manner of being isolated from each other.

In a virtualized running environment, the VMM creates a virtual network interface card (vNIC) for each virtual machine. A virtual switch (vSwitch) provides communication capability between the virtual machines and between the virtual machines and an external network. A virtual network interface card of each virtual machine corresponds to a logical port of the vSwitch. A physical network interface card of the host corresponds to a port connecting the vSwitch to an external physical switch. When a data packet sent or received by a virtual machine passes through the VMM, a virtual network function module in the VMM performs network function processing on the data packet. Because the virtual network function module is a software module that can be updated as required, it can provide plenty of network functions.

A network port of the physical network interface card supports a virtualization capability. This can be implemented by means of single-root input/output virtualization (SR-IOV) or multi-root input/output virtualization (MR-IOV). In this embodiment of the present application, the SR-IOV technology is used as an example for description. The SR-IOV technology is a hardware-based virtualization solution. A peripheral component interconnect express (PCIe) device can be efficiently shared between virtual machines. In addition, the SR-IOV technology is implemented in hardware, so that efficient I/O performance can be obtained.

SR-IOV specification is defined by the standardization organization Peripheral Component Interconnect Special Interest Group (PCI-SIG).

By using the SR-IOV technology, a single I/O resource may be shared by multiple virtual machines on a host. In this way, each virtual machine can access a same hardware resource. Therefore, a PCIe device with SR-IOV enabled (for example, the network port of the physical network interface card) may be displayed as multiple separate devices. Each separate device that is displayed has independent PCIe configuration space. A physical network interface card supporting SR-IOV is used as an example. The physical network interface card includes network ports, and can enable/disable an SR-IOV capability for each network port. A network port for which the SR-IOV capability is enabled corresponds to at least one physical function (PF) and multiple virtual functions (VFs). According to an existing SR-IOV specification, each PF may have a maximum of 64,000 VFs that are associated with the PF. After a VF is created, the VF may be directly assigned to a virtual machine on the host, so that the multiple virtual machines share the PCIe device by using at least one VF that is connected to the multiple virtual machines.

Figure 1B:
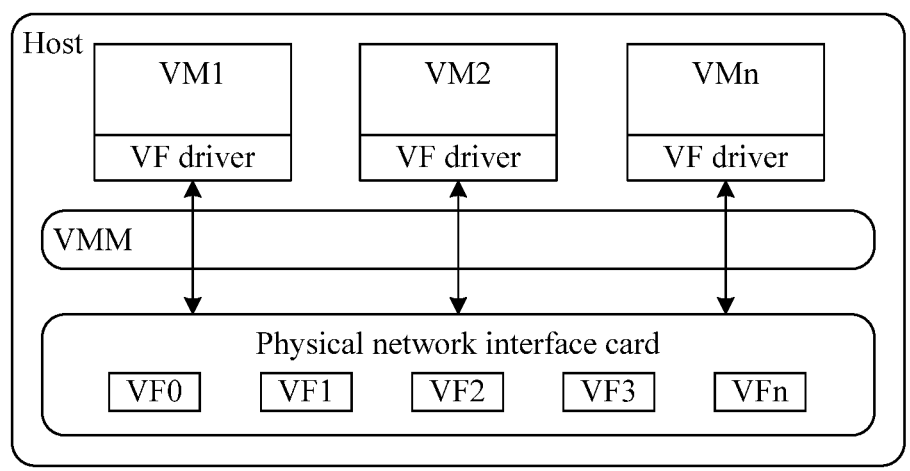
FIG. 1B is a schematic diagram of a virtualized structure on a host in a network interface card passthrough scenario according to an embodiment of the present application.

FIG. 1B is a schematic diagram of a virtualized structure on a host in a network interface card passthrough scenario according to an embodiment of the present application. FIG. 1B is different from FIG. 1A in that a physical network interface card supports single-root I/O virtualization, a network port of the physical network interface card corresponds to at least one PF and multiple VFs, and the VFs can share a physical resource of the physical network interface card (for example, a port of the network interface card).

When a virtual machine on the host sends a data packet by using a passthrough VF, the data packet from the virtual machine is directly transferred to the VF of the network interface card by using a VF driver installed on the virtual machine. As a result, the data packet cannot pass through a virtual network function module on a VMM. A switching apparatus of the network interface card has a limited MAC table capacity and a limited processing capability, and cannot extend network functions freely. Therefore, the network interface card is not capable of providing plenty of network functions. In a possible scenario, the switching apparatus is a virtual Ethernet bridge & classifier.

It should be noted that this embodiment of the present application is based on the network interface card passthrough scenario. The foregoing network interface card passthrough may be implemented by means of SR-IOV or MR-IOV, and this embodiment of the present application imposes no limitation thereon.

Figure 2:
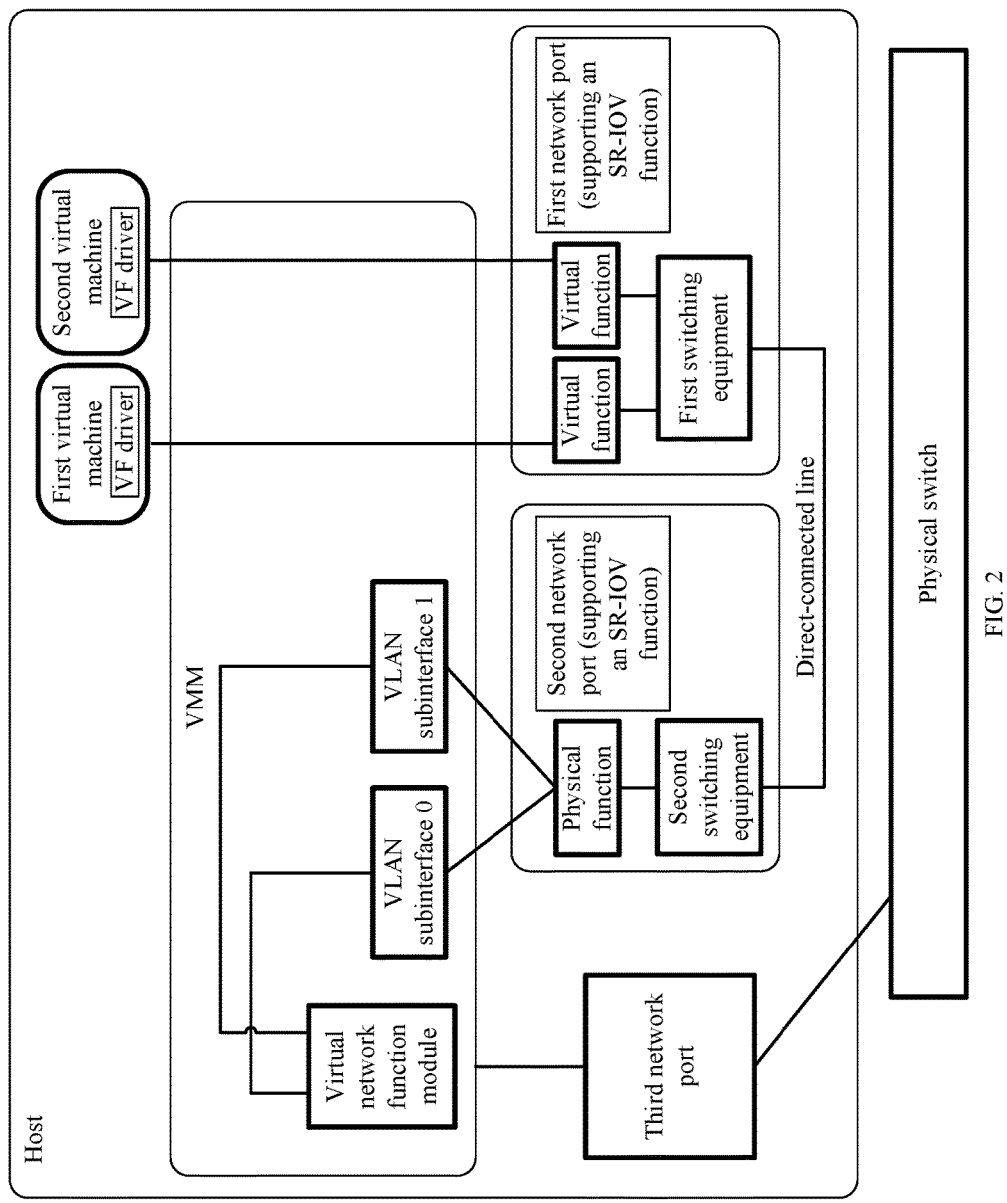
FIG. 2 is a schematic diagram of a virtualized architecture on a host according to another embodiment of the present application.

FIG. 2 is a schematic diagram of a virtualized architecture on a host according to another embodiment of the present application. The host includes a VMM and at least one physical network interface card. At least one virtual machine runs on the host. The at least one physical network interface card includes at least three network ports. A first network port and a second network port support a network interface card virtualization capability. A third network port is connected to an external physical switch of the host, and is responsible for sending and receiving cross-host network traffic. The first network port is virtualized into at least one PF and at least two VFs (in FIG. 2, two VFs are used as an example for description). A VF driver is installed on a first virtual machine and a second virtual machine. The first virtual machine and the second virtual machine are respectively connected to at least one VF. The first network port and the second network port are directly connected by using a network cable. A PF of the second network port is connected to a VLAN subinterface on the VMM. Therefore, all traffic sent from a virtual machine is detoured to the second network port by using the network cable, and the second network port directs the traffic back to a virtual network function module on the VMM. The network cable may be specifically a cable of any medium, including a twisted pair, an optical fiber, a coaxial cable, or the like. In this embodiment of the present application, the first network port and the second network port are directly connected by using the network cable. A data packet sent by a virtual machine that is connected to a VF of the first network port is forcibly forwarded to the second network port. Therefore, a transmission path of the data packet necessarily passes through the virtual network function module on the VMM. In this way, based on network interface card passthrough, the virtual network function module on the VMM provides more virtual network functions.

In FIG. 2, only two VFs and two VLAN subinterfaces are used as an example for description. In an actual product implementation, a network interface card supporting a network interface card virtualization function may be virtualized into at least one PF and multiple VFs. A quantity of VFs is not limited to two, and correspondingly, a quantity of VLAN subinterfaces is not limited to two, either.

In the embodiments of the present application, network interface card virtualization may be specifically hardware virtualization of a network interface card.

In the embodiments of the present application, a first network port is referred to as a passthrough network port, a second network port is referred to as an alternative network port, and a third network port is referred to as a service network port.

For the passthrough network port, a VF is provided for a virtual machine in a passthrough manner by using a standard SR-IOV/MR-IOV technology. Different virtual local area network (VLAN) identifiers are set for different VFs. Direct communication between multiple virtual machines that use the VF of the current network port is avoided, and a data packet of a virtual machine is forcibly sent from a network cable. Specifically, a VLAN identifier represents a broadcast domain. Therefore, when different VLAN identifiers are set for different VFs, VFs connected to virtual machines are in different broadcast domains. A broadcast packet can be sent only to a virtual machine on a VLAN, and therefore a broadcast packet sent from a virtual machine can be received only by the virtual machine itself and a PF by setting different VLAN identifiers for VFs. During setting of a VLAN identifier for a VF, it needs to be ensured that the VLAN identifier is unique within a host range. VLAN identifiers on different hosts may be the same.

VLAN subinterfaces are created on the VMM. A quantity of VLAN subinterfaces is the same as a quantity of VFs of the passthrough network port, and VLAN identifiers of the VLAN subinterfaces are in a one-to-one correspondence with VLAN identifiers of the VFs of the passthrough network port. On the alternative network port, a network port connected to the passthrough network port may be a PF, or may be a VF that is set to a promiscuous mode. The VLAN subinterface is a virtual bridge and has a layer 2 forwarding capability.

It should be noted that, in the embodiment shown in FIG. 2, sending a data packet to the second virtual machine by the first virtual machine is communication between two virtual machines within a same host. The second virtual machine and the first virtual machine may be alternatively located on different hosts. In this case, the first virtual machine communicates with the second virtual machine in a cross-host manner.

With reference to the virtualized structure of the host shown in FIG. 2, in this embodiment of the present application, a data packet processing process is described by using an example in which the first virtual machine sends a data packet to the second virtual machine. The first virtual machine sends the data packet to the second virtual machine by using the VF that is connected to the first virtual machine. The data packet carries a VLAN identifier of the VF that sends the data packet. A switching apparatus of the first network port receives the data packet, and forcibly forwards the data packet to the second network port by using the network cable. A switching apparatus of the second network port sends, according to the VLAN identifier carried in the data packet, the data packet to a VLAN subinterface that has a same VLAN identifier as the data packet. The VLAN subinterface receives the data packet, removes the VLAN identifier in the data packet, and sends the data packet to the virtual network function module. The virtual network function module performs network function processing on the changed data packet, and sends the processed data packet to the second virtual machine. In a network interface card passthrough scenario, after sending a data packet from a passthrough VF, a virtual machine may send the data packet to a virtual network function module on a VMM in the foregoing manner. Abundant virtual network functions are provided by using the software module, so as to implement virtual network function processing on the data packet.

Figure 3:
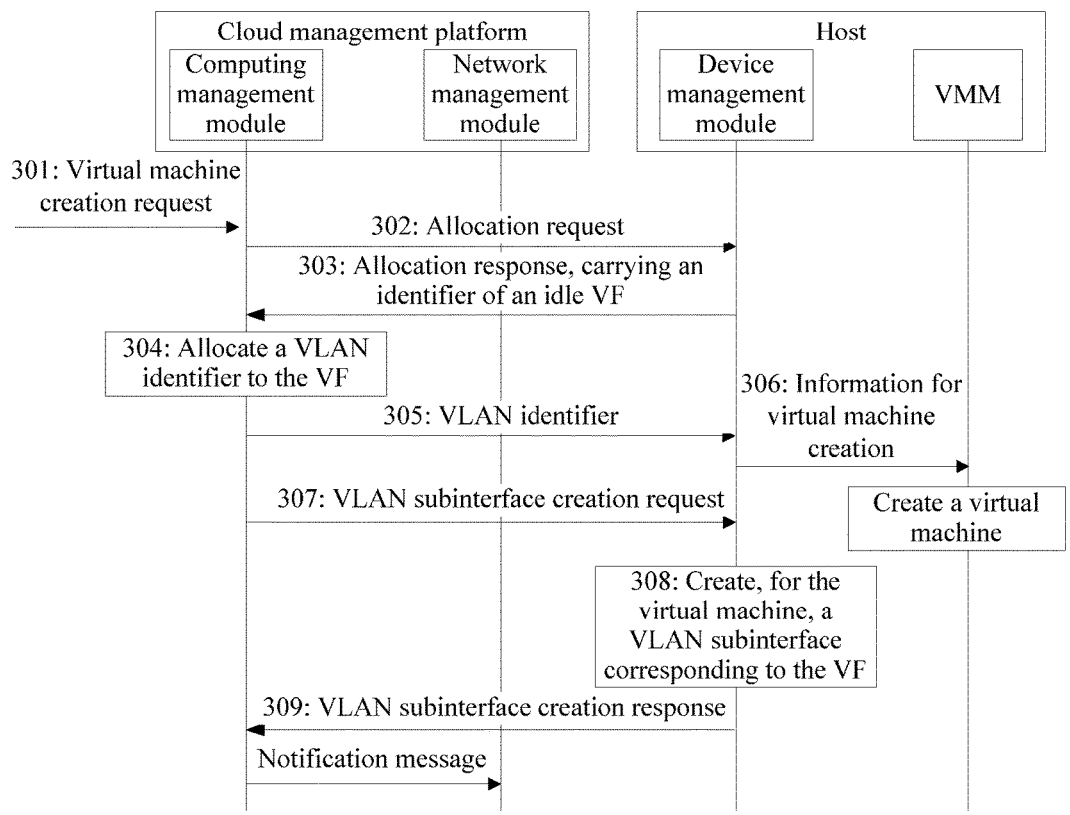
FIG. 3 is a flow diagram of a virtual machine creation process according to an embodiment of the present application.

In the foregoing process in which the first virtual machine sends the data packet to the second virtual machine, the VLAN identifier of the VF connected to the first virtual machine is the same as a VLAN identifier of the corresponding VLAN subinterface in the VMM. FIG. 3 is a flow diagram of a virtual machine creation process according to an embodiment of the present application. The process is used to create a virtual machine with a passthrough VF and create a VLAN subinterface corresponding to the passthrough VF.

Step 301: A computing management module receives a virtual machine creation request, where the virtual machine creation request is used to create a virtual machine with a passthrough VF.

In a scenario, a virtual machine creation process may be initiated by an administrator or a user. The administrator or the user logs in to, by using a terminal, an externally presented interface of a cloud management platform, selects a specification of a to-be-created virtual machine, and initiates a virtual machine creation request to the computing management module. The virtual machine creation request carries a parameter of the to-be-created virtual machine, and the parameter includes information indicating that the to-be-created virtual machine has a passthrough VF.

Step 302: The computing management module sends an allocation request to a device management module, to request to allocate a VF to the to-be-created virtual machine.

Step 303: The device management module returns an identifier of an idle VF to the computing management module, where the idle VF is a VF that is on a host and that is not allocated to a virtual machine.

Step 304: The computing management module allocates a VLAN identifier to the VF.

Step 305: The computing management module sends the VLAN identifier to the device management module, and the device management module configures the VLAN identifier for the allocated VF.

Step 306: The device management module sends information for virtual machine creation to a VMM, where the information for virtual machine creation includes the VLAN identifier of the VF.

Step 306: The VMM creates the virtual machine, and sets the VF as a passthrough network port of the virtual machine.

Step 307: After the virtual machine is successfully created, the computing management module sends a VLAN subinterface creation request to the device management module, where the VLAN subinterface creation request carries the VLAN identifier of the VF.

Step 308: The device management module receives the VLAN subinterface creation request, creates, on the VMM, a VLAN subinterface corresponding to the VF, and configures a VLAN identifier of the VLAN subinterface to be the same as that of the VF.

It should be noted that the VLAN subinterface is a virtual network device provided by a LINUX® system, and may be created directly according to an ip command of the LINUX® system. For example, a command for creating a VLAN subinterface whose VLAN identifier is 100 is as follows: ip link add link eth0 name vlan100 type vlan id 100.

Step 309: The computing management module receives a VLAN subinterface creation response message, sends a notification message to a network management module, and connects the created VLAN subinterface to a bridge corresponding to the network management module.

It should be noted that a virtual machine may have multiple passthrough VFs. A specific creation process is similar to the foregoing steps, but different VLAN identifiers are set for passthrough VFs and VLAN subinterfaces in a one-to-one correspondence with the passthrough VFs are created on the VMM.

Figure 4:
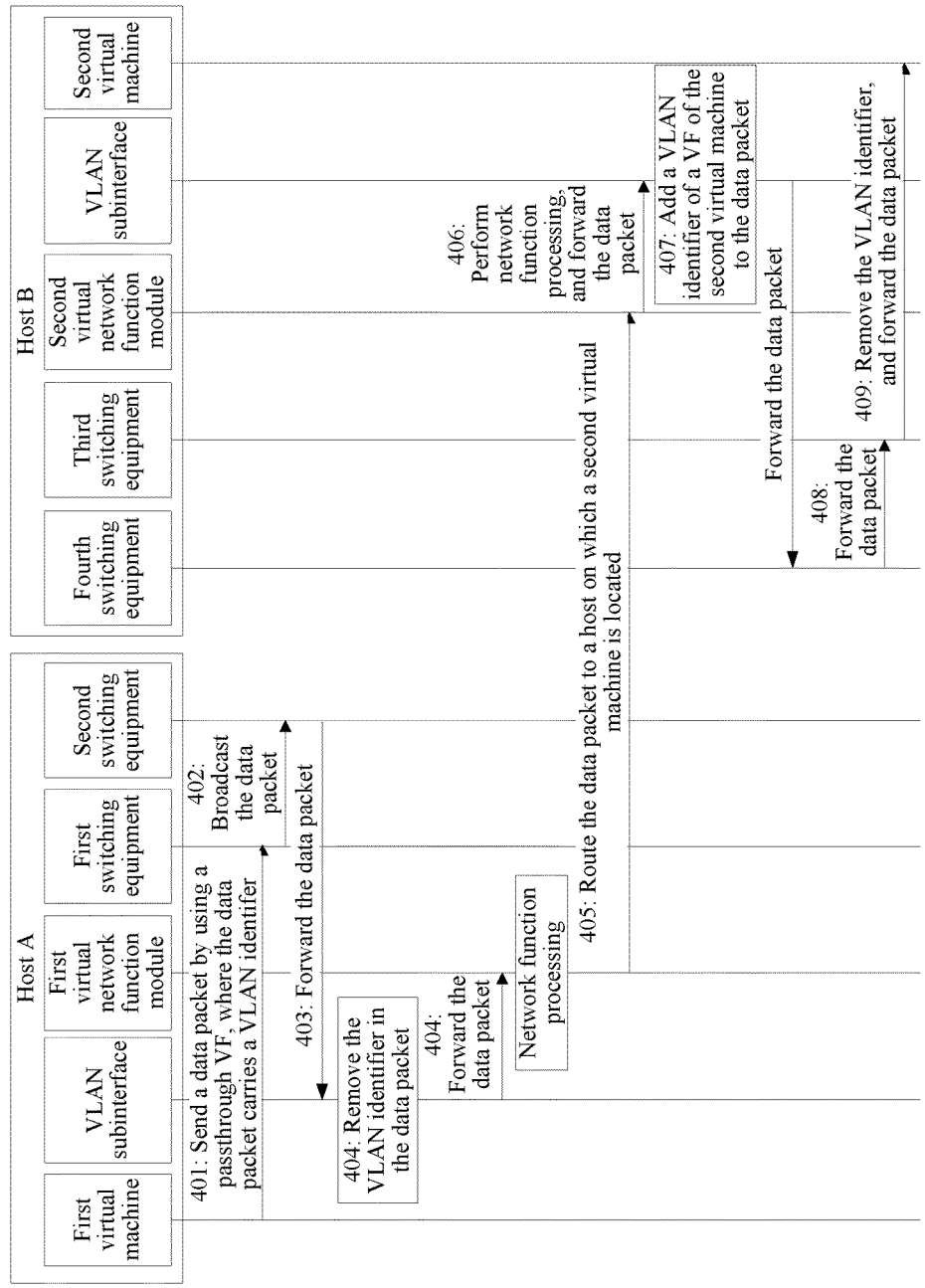
FIG. 4 is a flowchart of a packet processing method in a cloud computing system according to an embodiment of the present application.

FIG. 4 is a flowchart of a packet processing method in a cloud computing system according to an embodiment of the present application. In this embodiment of the present application, an example in which a first virtual machine on a host A communicates with a second virtual machine on a host B is used for description.

Step 401: The first virtual machine on the host A sends a data packet by using a VF that is connected to the first virtual machine, where a destination address of the data packet is an address of the second virtual machine, and the data packet carries a VLAN identifier of the VF that sends the data packet.

Step 402: Switching apparatus (first switching apparatus) of a passthrough network port receives the data packet, and broadcasts the received data packet. VLAN identifiers of VFs on the passthrough network port are different from each other and the VFs are located on different virtual local area networks. Therefore, other VFs on the passthrough network port do not receive the broadcast data packet, and the data packet is forcibly sent to an alternative network port by using a network cable.

It should be noted that the passthrough network port and the alternative network port are in a virtual Ethernet port aggregator (VEPA) mode. The VEPA mode is used to instruct the passthrough network port and the alternative network port to forcibly forward the received data packet. The VEPA mode is defined in the IEEE802.1Qbg standard.

Step 403: Switching apparatus (second switching apparatus) of an alternative network port receives the data packet from the passthrough network port, and sends, according to the VLAN identifier carried in the data packet, the data packet to a VLAN subinterface that is on a VMM and that has a same VLAN identifier as the data packet.

Step 404: The VLAN subinterface receives the data packet, removes the VLAN identifier in the data packet, and sends the data packet to a first virtual network function module.

Step 405: The first virtual network function module performs network function processing on the data packet, and sends the data packet to a service network port. The service network port of the host A sends the received data packet to an external network of the host. The data packet is routed to a service network port of the host B on which the second virtual machine is located, and the service network port of the host B sends the data packet to a second virtual network function module of the host B after receiving the data packet.

Specifically, a tunnel may be established between the first virtual network function module of the host A and the second virtual network function module of the host B. By using a tunnel technology, the data packet is transferred to the virtual network function module of the host B by using a network between the host A and the host B.

Step 406: After performing network function processing, the second virtual network function module of the host B sends the data packet to a VLAN subinterface corresponding to a VF that is connected to the second virtual machine. The VF that is connected to the second virtual machine has a same VLAN identifier as the VLAN subinterface receiving the data packet.

It should be noted that, in a possible scenario, the VLAN subinterface is connected to a virtual bridge implemented by software, and the virtual bridge provides a layer 2 forwarding capability to send the data packet to the VLAN subinterface. A same VLAN identifier is set for the VLAN subinterface and the corresponding VF. Therefore, a VF that is provided for the second virtual machine in a passthrough manner may receive the data packet.

Step 407: The VLAN subinterface adds a VLAN identifier to the data packet, where the VLAN identifier is a VLAN identifier of the VLAN subinterface; and sends the data packet to the alternative network port. Because VLAN subinterfaces connected to the alternative network port have different VLAN identifiers, switching apparatus (fourth switching apparatus) of the alternative network port forcibly forwards the data packet to the passthrough network port by using the network cable.

Step 408: Switching apparatus (third switching apparatus) of the passthrough network port sends, according to the VLAN identifier carried in the data packet, the data packet to the VF identified by the VLAN identifier.

Step 409: The VF removes the VLAN identifier in the data packet, and sends the data packet to the second virtual machine.

It should be noted that, in this embodiment of the present application, the passthrough network port, the alternative network port, and the service network port may be located on a same network interface card, or may be independently located on different network interface cards. This embodiment of the present application imposes no limitation thereon. Further, when the passthrough network port and the alternative network port are located on a same network interface card, each of the passthrough network port and the alternative network port may have independent switching apparatus, or the passthrough network port and the alternative network port share same switching apparatus.

It should be noted that, in a specific implementation scenario, the VLAN subinterface in this embodiment of the present application may be an Open vSwitch.

In this embodiment of the present application, VFs of a passthrough network port have different VLAN identifiers. VLAN subinterfaces in one-to-one correspondence with the VFs of the passthrough network port are set on a VMM. Each VLAN subinterface has a same VLAN identifier as a corresponding VF. After a virtual machine sends a data packet from a VF, the data packet is forcibly forwarded to switching apparatus of an alternative network port because the passthrough network port and the alternative network port are directly connected by using a network cable, and the data packet carries a VLAN identifier of the VF. The switching apparatus of the alternative network port sends, according to the VLAN identifier carried in the data packet, the data packet to a VLAN subinterface that has a same VLAN identifier as the data packet, so that the data packet is sent to the VMM. Further, a virtual network function module on the VMM performs network function processing and sends the processed data packet to a second virtual machine. In a network interface card passthrough scenario, a data packet is sent to a virtual network function module on a VMM in the foregoing manner. By using software module, network function flexibility is implemented and abundant network functions are provided.

The embodiment corresponding to FIG. 4 provides a process of transmitting a data packet between two virtual machines on two hosts. A source virtual machine and a destination virtual machine of the data packet may be located on a same host. In this case, after performing network function processing on the data packet, a virtual network function module on the host sends the processed data packet to a VLAN subinterface corresponding to a VF that is connected to a second virtual machine. The VLAN subinterface sends the data packet to the second virtual machine.

Figure 5:
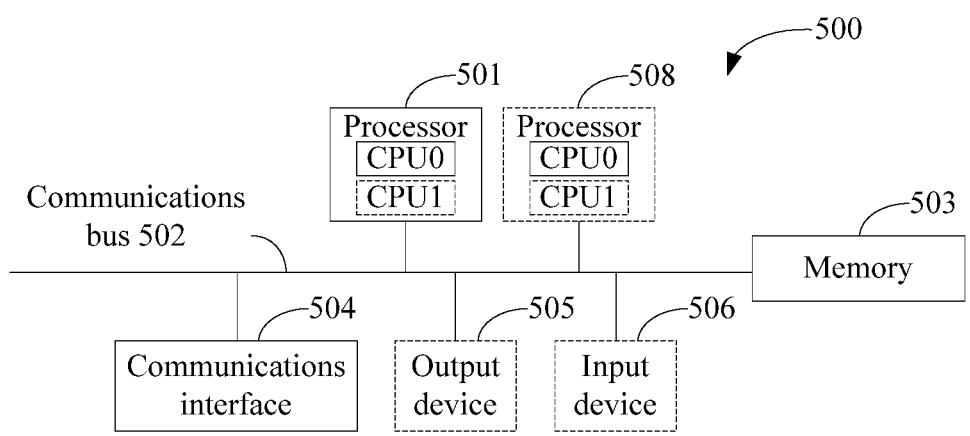
FIG. 5 is a simplified structural diagram of a computer device according to an embodiment of the present application.

The host and a cloud management platform may use a general-purpose computer device. For example, FIG. 5 is a schematic structural diagram of hardware of a computer device according to an embodiment of the present application. The computer device 500 includes at least one processor 501, a communications bus 502, a memory 503, and at least one communications interface 504.

The processor 501 may be a general-purpose central processing unit (CPU), a microprocessor, an application-specific integrated circuit (ASIC), or one or more integrated circuits configured to control program execution in the solutions of the present application.

The communications bus 502 may include a path for transferring information between the foregoing components. The communications interface 504 uses an apparatus such as a transceiver to communicate with another device or a communications network such as an Ethernet, a radio access network (RAN), or a wireless local area network (WLAN).

The memory 503 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. No limitation is imposed thereon. The memory may exist alone and is connected to the processor by using the bus. Alternatively, the memory may be integrated with the processor.

The memory 503 is configured to store application program code for executing the solutions in the present application, and the processor 501 controls the execution. The processor 501 is configured to execute the application program code stored in the memory 503.

In a specific implementation, in an embodiment, the processor 501 may include one or more CPUs, for example, a CPU0 and a CPU1 in FIG. 5.

In a specific implementation, in an embodiment, the computer device 500 may include multiple processors, for example, the processor 501 and a processor 508 in FIG. 5. Each of the processors may be a single-core processor, or may be a multi-core processor. The processor herein may be one or more devices, circuits, and/or processing cores that are configured to process data (for example, a computer program instruction).

In a specific implementation, in an embodiment, the computer device 500 may further include an output device 505 and an input device 506. The output device 505 communicates with the processor 501, and can display information in multiple manners. For example, the output device 505 may be a liquid crystal display (LCD), a light emitting diode (LED) display device, a cathode ray tube (CRT) display device, a projector, or the like. The input device 506 communicates with the processor 501, and may receive a user input in multiple manners. For example, the input device 506 may be a mouse, a keyboard, a touchscreen device, a sensing device, or the like.

The computer device 500 may be a general-purpose computer device or a dedicated computer device. In a specific implementation, the computer device 500 may be a desktop computer, a portable computer, a network server, a personal digital assistant (PDA), a mobile phone, a tablet computer, a wireless terminal device, a communications device, an embedded device, or a device with a structure similar to the structure in FIG. 5. This embodiment of the present application imposes no limitation on a type of the computer device 500.

The cloud management platform and the host in FIG. 2 may be the device shown in FIG. 5. The memory stores one or more software modules for implementing functions of the host and the cloud management platform. The host and the cloud management platform may implement, by using the processor and the program code in the memory, the packet processing method disclosed in the embodiments of the present application.

It should be noted that the computer device shown in FIG. 5 only provides possible hardware implementations of parts in a cloud computing system. According to differences or variations of functions of the parts in the system, hardware components of the computer device may be added or deleted, to match the functions of the parts in the system.

Further, similar to the hardware apparatus shown in FIG. 5, the network interface card in the foregoing embodiments includes a processor and a memory. The processor in the network interface card executes an instruction in the memory to implement a function of the foregoing switching apparatus. Details are not described again in this embodiment of the present application.

Figure 6:
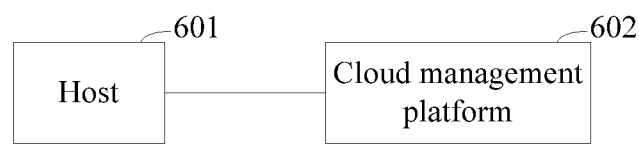
FIG. 6 is a block diagram of a cloud computing system according to an embodiment of the present application.

Still further, FIG. 6 is a schematic structural diagram of a cloud computing system according to an embodiment of the present application. The cloud computing system includes at least one host 601 and a cloud management platform 602. A structure of the host 601 is shown in FIG. 2.

The host 601 includes a virtual machine monitor VMM and at least one network interface card. A first virtual machine runs on the host 601. The VMM includes multiple VLAN subinterfaces and a virtual network function module, and the at least one network interface card includes switching apparatus and at least three network ports. A first network port and a second network port support a network interface card virtualization capability. The first network port corresponds to at least one PF and multiple VFs. VLAN identifiers are configured for the multiple VFs and the VLAN identifiers of the VFs are different from each other. The first virtual machine is connected to at least one VF of the first network port. A quantity of VLAN subinterfaces is the same as a quantity of VFs of the first network port and the VLAN subinterfaces are in a one-to-one correspondence with the VFs of the first network port. The VLAN subinterfaces have same VLAN identifiers as the VFs corresponding to the VLAN subinterfaces. The first network port and the second network port are connected by using a network cable.

The cloud management platform 602 is configured to create the first virtual machine on the host, and after successfully creating the first virtual machine, instruct the VMM of the host to create a VLAN subinterface corresponding to the VF of the first virtual machine. The VLAN subinterface corresponding to the VF of the first virtual machine has a same VLAN identifier as the VF of the first virtual machine.

The first virtual machine is configured to send a data packet to a second virtual machine by using the VF that is connected to the first virtual machine. The data packet carries a VLAN identifier of the VF that sends the data packet, and an address of the second virtual machine.

Switching apparatus of the first network port is configured to receive the data packet, and forcibly forward the data packet to the second network port by using the network cable.

Switching apparatus of the second network port is configured to receive the data packet from the first network port, and send, according to the VLAN identifier carried in the data packet, the data packet to the VLAN subinterface that has a same VLAN identifier as the data packet.

The VLAN subinterface is configured to receive the data packet, remove the VLAN identifier in the data packet, and send the data packet to the virtual network function module.

The virtual network function module is configured to perform network function processing on the changed data packet, and send the processed data packet. A destination address of the processed data packet is the address of the second virtual machine.

An embodiment of the present application further provides a computer storage medium that is configured to store a computer software instruction used by the devices in FIG. 2 to FIG. 6. The computer software instruction includes a program designed for executing the foregoing method embodiments. A packet processing method in a cloud computing system may be implemented by executing a stored program.

The packet processing method in a cloud computing system, the host, and the system that are provided in the embodiments of the present application are applied to a network interface card passthrough scenario. According to the packet processing process disclosed in the embodiments of the present application, a virtual machine may send the data packet to a virtual network function module on a VMM after sending a data packet from a passthrough VF. Abundant network functions are provided by using the software module, so as to implement network function processing on the data packet.

Although the present application is described with reference to the embodiments, in a process of implementing the embodiments of the present application that claims protection, another variation of the disclosed embodiments may be implemented by viewing the accompanying drawings, disclosed content, and the accompanying claims. In the claims, the word "comprising" does not exclude other constituent parts or steps. A single processor or another unit may implement functions enumerated in the claims. Some measures are recorded in dependent claims that are different from each other, but this does not mean that these measures cannot be combined to produce a better effect.

The embodiments of the present application may be provided as a method, an apparatus (device), or a computer program product. Therefore, the present application may use a form of hardware only embodiments, software only embodiments, or embodiments with a combination of software and hardware. Moreover, the embodiments of the present application may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The computer program instructions in the embodiments of the present application may be stored in a computer readable memory that can instruct a computer or another programmable data processing device to work in a specific manner. The computer program instructions may be executed to implement functions of components in the foregoing embodiments.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present application is described with reference to specific features and the embodiments thereof, obviously, various modifications and combinations may be made to them without departing from the spirit and scope of the present application. Correspondingly, the specification and accompanying drawings are merely illustrative description of the present application defined by the accompanying claims, and are considered as any of or all modifications, variations, combinations or equivalents that cover the scope of the present application. Obviously, various modifications and variations to the present application may be made without departing from the spirit and scope of the present application. The present application is intended to cover these modifications and variations provided that they fall within the scope of protection defined by the following claims and their equivalent technologies.

What is claimed is:

1. A computing device, comprising:
   a processor, a memory storing a software program for execution by the processor, and at least one network interface card;
   wherein the software program, when executed by the processor, performs functions of a virtualized computer system, and the virtualized computer system comprises:
   a plurality of virtual machines, and a virtual machine monitor (VMM);
   wherein the VMM comprises:
   a virtual network function module, and a number of virtual local area network (VLAN) subinterfaces, each VLAN subinterface having a different VLAN identifier;
   wherein the at least one network interface card comprises:
   a first network port and a second network port, connected with each other by a network cable;
   wherein the first network port corresponds to a same number of virtual functions (VFs) as the number of VLAN subinterfaces in the VMM, and each of the VFs is configured with a VLAN identifier that is the same as one of the VLAN identifiers of the VLAN subinterfaces;
   wherein, when a first virtual machine sends a data packet to a second virtual machine by using a first VF, the data packet carrying a VLAN identifier of the first VF and an address of the second virtual machine, the first network port receives the data packet, and forwards the data packet to the second network port by using the network cable;

the second network port sends the data packet to a first VLAN subinterface corresponding to the VLAN identifier carried in the data packet;

the first VLAN subinterface removes the VLAN identifier in the data packet, and sends the changed data packet to the virtual network function module; and the virtual network function module performs a network function processing on the changed data packet, and sends the processed data packet to the second virtual machine.

2. The computing device according to claim 1, wherein the first network port and the second network port are in a virtual Ethernet port aggregator (VEPA) mode.

3. The computing device according to claim 1, wherein the virtualized computer system further comprises a device management module, wherein after the first virtual machine is successfully created, the device management module receives a VLAN subinterface creation request from a cloud management platform, the VLAN subinterface creation request carries a VLAN identifier of a VF that is allocated to the first virtual machine; and the device management module sends a notification message to the VMM, to instruct the VMM to create a VLAN subinterface corresponding to the VF of the first virtual machine; and wherein the VLAN subinterface corresponding to the VF of the first virtual machine has a same VLAN identifier as the VF of the first virtual machine.

4. The computing device according to claim 1, wherein the at least one network interface card further comprises a third network port, and wherein the first network port, the second network port, and the third network port are arranged in one of the following ways:

the first network port, the second network port, and a third network port are located on a same network interface card; or the first network port, the second network port, and a third network port are located on two or three network interface cards; or the first network port and the second network port are located on a same network interface card, and the first network port and the second network port share a switching apparatus of the network interface card; or the first network port and the second network port are located on a same network interface card, and a switching apparatus of the first network port is independent of a switching apparatus of the second network port.

5. The computing device according to claim 1, wherein the second virtual machine and the first virtual machine are created on a same computing device.

6. The computing device according to claim 5, wherein when the virtual network function module sends the processed data packet to the second virtual machine, the virtual network function module sends the processed data packet to a second VLAN subinterface in the VMM that has a same VLAN identifier as a second VF that is connected to the second virtual machine;

the second VLAN subinterface adds a VLAN identifier of the second VLAN subinterface to the processed data packet, and sends the processed data packet to the second network port;

the second network port forwards the processed data packet to the first network port by using the network cable;

the first network port sends the processed data packet to the second VF identified by the VLAN identifier; and the second VF sends the processed data packet to the second virtual machine.

7. The computing device according to claim 1, wherein the at least one network interface card further comprises a third network port;

the computing device acts as a host for the virtualized computer system, and a tunnel is established between the virtual network function module of the VMM and another virtual network function module of another VMM on another host running the second virtual machine;

the virtual network function module sends the processed data packet to the other host, on which the second virtual machine runs, by using the third network port.

8. A packet processing method in a cloud computing system, wherein the cloud computing system comprises a plurality of virtual machines, a virtual machine monitor (VMM) and at least one network interface card; the VMM comprises a virtual network function module, and a number of virtual local area network (VLAN) subinterfaces, each VLAN subinterface having a different VLAN identifier; and the at least one network interface card comprises a first network port and a second network port;

wherein the first network port corresponds to a same number of virtual functions (VFs) as the number of VLAN subinterfaces in the VMM, and each of the VFs is configured with a VLAN identifier that is the same as one of the VLAN identifiers of the VLAN subinterfaces, wherein the method comprises:

sending, by a first virtual machine, a data packet destined to a second virtual machine by using a first VF, wherein the data packet carries a VLAN identifier of the first VF and an address of the second virtual machine;

receiving, by the first network port, the data packet, and forwarding the data packet to the second network port by using a network cable connected between the first network port and the second network port;

sending, by the second network port, the data packet to a first VLAN subinterface corresponding to the VLAN identifier carried in the data packet;

removing, by the first VLAN subinterface, the VLAN identifier in the data packet, and sending the changed data packet to the virtual network function module;

performing, by the virtual network function module, a network function processing on the changed data packet; and sending, by the virtual network function module, the processed data packet to the second virtual machine.

9. The method according to claim 8, wherein the first network port and the second network port are in a virtual Ethernet port aggregator (VEPA) mode.

10. The method according to claim 8, wherein the cloud computing system further comprises a device management module, and the method further comprises:

receiving, by the device management module after the first virtual machine is successfully created, a VLAN subinterface creation request from a cloud management platform, wherein the VLAN subinterface creation request carries a VLAN identifier of a VF that is allocated to the first virtual machine; and sending, by the device management module, a notification message to the VMM, to instruct the VMM to create a VLAN subinterface corresponding to the VF of the first virtual machine;

wherein the VLAN subinterface corresponding to the VF of the first virtual machine has a same VLAN identifier as the VF of the first virtual machine.

11. The method according to claim 8, wherein the at least one network interface card further comprises a third network port, and wherein the first network port, the second network port, and the third network port are arranged in one of the following ways:

the first network port, the second network port, and a third network port are located on a same network interface card; or the first network port, the second network port, and a third network port are located on two or three network interface cards; or the first network port and the second network port are located on a same network interface card, and the first network port and the second network port share a switching apparatus of the network interface card; or the first network port and the second network port are located on a same network interface card, and a switching apparatus of the first network port is independent of a switching apparatus of the second network port.

12. The method according to claim 8, wherein the second virtual machine and the first virtual machine are created on a same host.

13. The method according to claim 12, wherein sending the processed data packet to the second virtual machine comprises:

sending, by the virtual network function module, the processed data packet to a second VLAN subinterface in the VMM that has a same VLAN identifier as a second VF that is connected to the second virtual machine;

adding, by the second VLAN subinterface, a VLAN identifier of the second VLAN subinterface to the processed data packet, and sending the processed data packet to the second network port;

forwarding, by the second network port, the processed data packet to the first network port by using the network cable;

sending, by the first network port, the processed data packet to the second VF identified by the VLAN identifier; and sending, by the second VF, the processed data packet to the second virtual machine.

14. The method according to claim 8, wherein the first virtual machine is located on a first host and the second virtual machine is located on a second host; wherein the at least one network interface card further comprises a third network port; wherein sending the processed data packet to the second virtual machine comprises:

establishing, by the virtual network function module, a tunnel between the virtual network function module and another virtual network function module on the second host; and sending, by the virtual network function module, the processed data packet to the second host by using the third network port via the tunnel.

15. A cloud computing system, comprising software components running on a hardware structure to form a cloud management platform and a host, wherein the host comprises:

a plurality of virtual machines, a virtual machine monitor (VMM), and at least one network interface card;

wherein the VMM comprises:

a virtual network function module, and a number of virtual local area network (VLAN) subinterfaces, each VLAN subinterface having a different VLAN identifier;

wherein the at least one network interface card comprises:

a first network port and a second network port, connected with each other by a network cable;

wherein the first network port corresponds to a same number of virtual functions (VFs) as the number of VLAN subinterfaces in the VMM, and each of the VFs is configured with a VLAN identifier that is the same as one of the VLAN identifiers of the VLAN subinterfaces;

wherein the cloud management platform is configured to create a first virtual machine on the host, and after successfully creating the first virtual machine, instruct the VMM of the host to create a VLAN subinterface corresponding to a VF of the first virtual machine, the VLAN subinterface and the VF having a same VLAN identifier;

the first virtual machine is configured to send a data packet to a second virtual machine by using the VF, the data packet carrying the VLAN identifier of the VF and an address of the second virtual machine;

the first network port is configured to receive the data packet, and forward the data packet to the second network port by using the network cable;

the second network port is configured to send the data packet to the VLAN subinterface that has a same VLAN identifier as in the data packet;

the VLAN subinterface is configured to remove the VLAN identifier in the data packet, and send the changed data packet to the virtual network function module; and the virtual network function module is configured to perform a network function processing on the changed data packet, and send the processed data packet to the second virtual machine.

16. The cloud computing system according to claim 15, wherein the first network port and the second network port are in a virtual Ethernet port aggregator (VEPA) mode.

17. The cloud computing system according to claim 15, wherein the host further comprises a device management module, and the device management module is configured to:

after the first virtual machine is successfully created, receive a VLAN subinterface creation request from the cloud management platform, wherein the VLAN subinterface creation request carries the VLAN identifier of the VF that is allocated to the first virtual machine; and send a notification message to the VMM to instruct the VMM to create the VLAN subinterface corresponding to the VF of the first virtual machine, wherein the VLAN subinterface has a same VLAN identifier as the VF of the first virtual machine.

18. The cloud computing system according to claim 15, wherein the second virtual machine and the first virtual machine are located on a same host; wherein in sending the processed data packet to the second virtual machine, the virtual network function module is further configured to send the processed data packet to a second VLAN subinterface in the VMM that has a same VLAN identifier as a second VF that is connected to the second virtual machine;

the second VLAN subinterface is configured to add a VLAN identifier of the second VLAN subinterface to the processed data packet, and send the processed data packet to the second network port;

the second network port is configured to forward the processed data packet to the first network port by using the network cable; and the first network port is configured to send the processed data packet to the second virtual machine via the second VF identified by the VLAN identifier.

19. The cloud computing system according to claim 15, wherein the at least one network interface card further comprises a third network port; wherein the second virtual machine and the first virtual machine are located on different hosts; and wherein in sending the processed data packet to the second virtual machine, the virtual network function module is configured to establish a tunnel between the virtual network function module and another virtual network function module on another host on which the second virtual machine is located, and send the processed data packet to the second host by using a third network port via the tunnel.

* * * * *